United States Patent [19]

Bjorksten

[11] 4,174,014
[45] Nov. 13, 1979

[54] SHOCK ABSORBENT ELECTRIC VEHICLE AND BATTERIES

[76] Inventor: Johan A. Bjorksten, P.O. Box 9444, Madison, Wis. 53715

[21] Appl. No.: 840,391

[22] Filed: Oct. 7, 1977

Related U.S. Application Data

[63] Continuation of Ser. No. 645,249, Dec. 29, 1975, abandoned.

[51] Int. Cl.² .............................................. B60L 11/18
[52] U.S. Cl. .................................................... 180/68.5
[58] Field of Search ........................... 429/99, 100, 96; 161/404, 405; 206/521, 523, 524; 75/20 F; 180/65 R, 65 E, 65 F, 60; 105/51, 50

[56] References Cited

U.S. PATENT DOCUMENTS

| | | | |
|---|---|---|---|
| 1,173,616 | 2/1916 | Stone | 180/68.5 |
| 1,179,407 | 4/1916 | Decker | 180/65 E |
| 1,578,302 | 3/1926 | Walter | 180/68.5 X |
| 2,640,864 | 6/1953 | Fishbach | 204/2.1 |
| 2,751,289 | 6/1956 | Elliott | 75/20 R |
| 3,391,752 | 7/1968 | Albright | 180/65 R |
| 3,497,027 | 2/1970 | Wild | 180/68.5 X |
| 3,531,327 | 9/1970 | Moos | 429/13 |
| 3,692,585 | 9/1972 | Mayo | 429/18 |
| 3,846,178 | 11/1974 | Eijen et al. | 429/82 |
| 3,897,221 | 7/1975 | Salyer et al. | 75/20 F |

*Primary Examiner*—Joseph E. Peters, Jr.
*Assistant Examiner*—Milton L. Smith
*Attorney, Agent, or Firm*—John M. Diehl; Johan A. Bjorksten

[57] ABSTRACT

Storage batteries and/or aggregates thereof are constructed to provide a high impact absorbency, so that their mass will serve a dual function: storing electricity and absorbing collision impacts.

The collision protection for humans also involves two separate functions: impact absorption and gradual deceleration. The former is achieved by adding highly shock absorbent closed cell foamed metal plates to the battery aggregate, the second by spacing these in such a way that the impact absorption occurs gradually, so that the deceleration at no point exceeds that of 7 times gravity acceleration. To this end the battery aggregate is designed so that the shock energy absorption occurs in many centers or zones of the battery aggregate, thus providing a safe deceleration curve over a distance equal to the distance from leading side to trailing side of the battery aggregates as installed. The liquid electrolyte in the battery cells will contribute to the smooth action, as it is released in case of crushing impact, and then provides hydrostatic uniform pressure on some of the energy absorbing plates during the critical milliseconds, thereby favoring gradual compression as distinct from rupture.

The shock absorbent closed cell metal may be used in electrodes or grids of some or all of the cells, or it may be employed as foamed auxiliary plates or inserts without electrogalvanic functions. The invention also contemplates electrically powered vehicles in which the weight of the electric storage aggregates are designed to maximally increase collision protection by specific design criteria.

1 Claim, 12 Drawing Figures

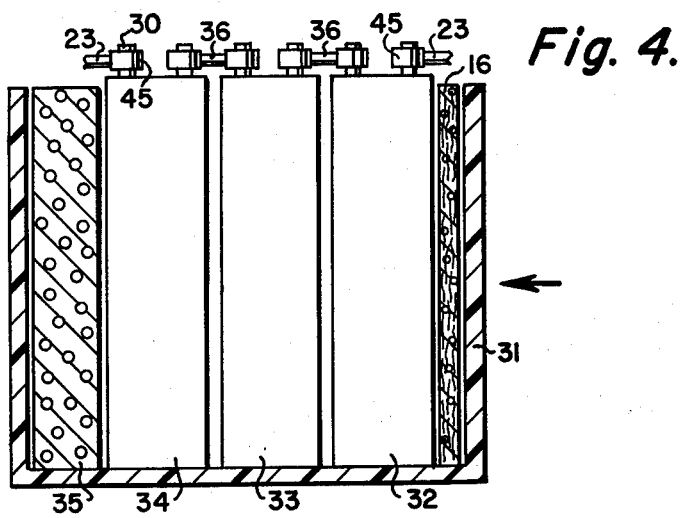
Fig. 4.
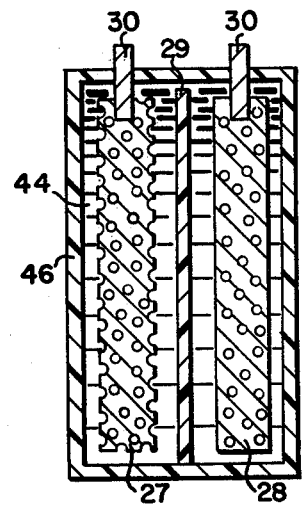
Fig. 7.
Fig. 5.
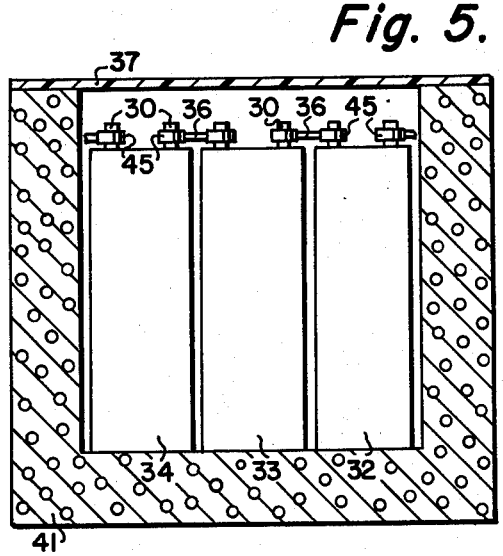
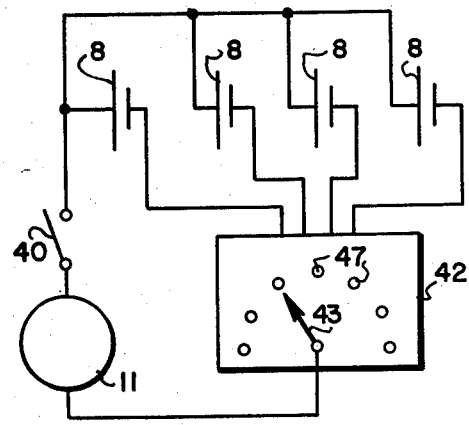
Fig. 8.
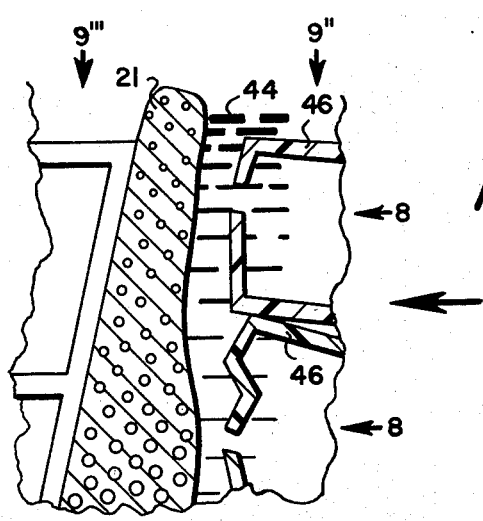
Fig. 6.

SHOCK ABSORBENT ELECTRIC VEHICLE AND BATTERIES

This is a continuation, of application Ser. No. 645,249, filed Dec. 29, 1975 and now abandoned.

BACKGROUND OF THE INVENTION

This invention relates to electric batteries. It also relates to shock absorbers and to electric automobiles.

As fuel is becoming increasingly expensive, it becomes correspondingly more desirable to construct automobiles, which use a minimum of power, and which can use this power in the form of electricity. Weight is one of the most important factors in fuel economy of automobiles. Accordingly, the automobiles will be constructed lighter and lighter, with a leaning toward alloys of light metals such as aluminum and zinc, wherever applicable. In consequence of this, the automobiles become lighter in construction generally, resistance to shock will decline and the vehicles become more susceptible to damage in collision accidents of all kinds.

On the other hand, the batteries needed to store the electricity as driving power, will preempt a very large part of the total weight of the vehicle, usually about ⅓.

I am not aware of any previously used power source which has been designed to have a maximized shock absorbent function within itself, as an integral part, so that the weight and design of the battery aggregates are utilized to decisively enhance collision safety.

OBJECTS OF THE INVENTION

The present invention has for an object electrical storage aggregates adapted to function also as shock absorbers, so that the battery weight will become applicable to enhance safety, particularly collision protection, and so that the car can be built of lighter materials without detracting from its safety, thereby saving fuel.

Furthermore, this invention has for an object an electric storage aggregate or a battery of exceptional shock absorbency. Further objects will become apparent as the following detailed description proceeds.

BRIEF STATEMENT OF THE INVENTION

In order to utilize the mass and weight represented by the batteries for increased collision safety, a vehicle, for example an automobile is constructed so that the battery aggregates are placed in its front and back in positions to receive collision shocks and to mitigate these.

In these battery aggregates is comprised highly shock absorbent foamed metal; distributed so as to achieve a gradual deceleration to a safe stop in case of collision, or in any event to absorb even the violent shock of a dead stop so as to keep the deceleration below the safe limit of 7 gravities. The natural shock absorbency of the batteries and the cells, and their components is also utilized by construction, disposition or orientation as as further detailed below. To this end the battery grids or plates may be foamed, the battery casings may be made of closed cell foamed metal. Reliance may be placed in whole or in part, or alternatively, on the extremely high shock absorbency of foamed metal plates inserted so as to achieve a smooth and safe deceleration, enhanced by the hydrostatic shock distribution over a wide area achieved by these plates in hydrostatic contact with electrolyte fluid from crushed cells. For initial deceleration of high velocity shock, it is desirable to use on the front side a metal fiber reinforced metal foam, which will not readily shear or puncture, but will deform over a wide area, for maximal initial braking.

In order to provide battery components having maximum efficiency in this application, zinc may be utilized as one of the electrode plates, for example, in zinc-nickel hydroperoxide cells. This zinc may be foamed, preferably by inclusion of small gas cells, these cells having a form as close to the spherical as is conveniently arrangeable. The spherical bubble form provides a maximum of compressive strength and shock energy absorption.

While zinc is preferred, the invention also applies to other systems, such as lead acid batteries in which the lead plates or grids are expanded by foaming, and to cell construction and arrangements as further detailed below. The invention further includes electric vehicles designed to optimally utilize this invention.

However, the complete absorption of shock is not enough except in automatically controlled cargo carriers. Where human lives are involved, it is equally necessary that the rate of deceleration be tolerated. The limit of deceleration is regarded by the Air Force as about 10 G; however, for a use directed to public safety, I believe that 7 G is a more realistic requirement. This is achieved by appropriate spacing of the shock absorbent members within the battery aggregate.

THE DRAWINGS

FIG. 4 is a sectional detail view of another embodiment of the invention.

FIG. 5 is a sectional detail view of another embodiment of the invention.

FIG. 6 is a detail view of FIG. 9.

FIG. 7 is a sectional view of a battery.

FIG. 8 is a wiring diagram.

Figure 10:
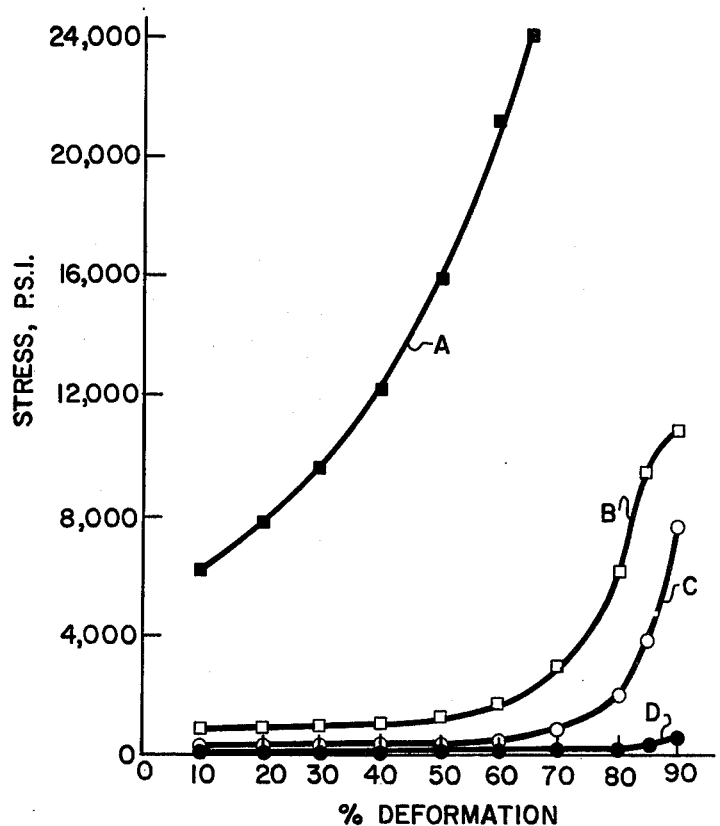
Figure 11:
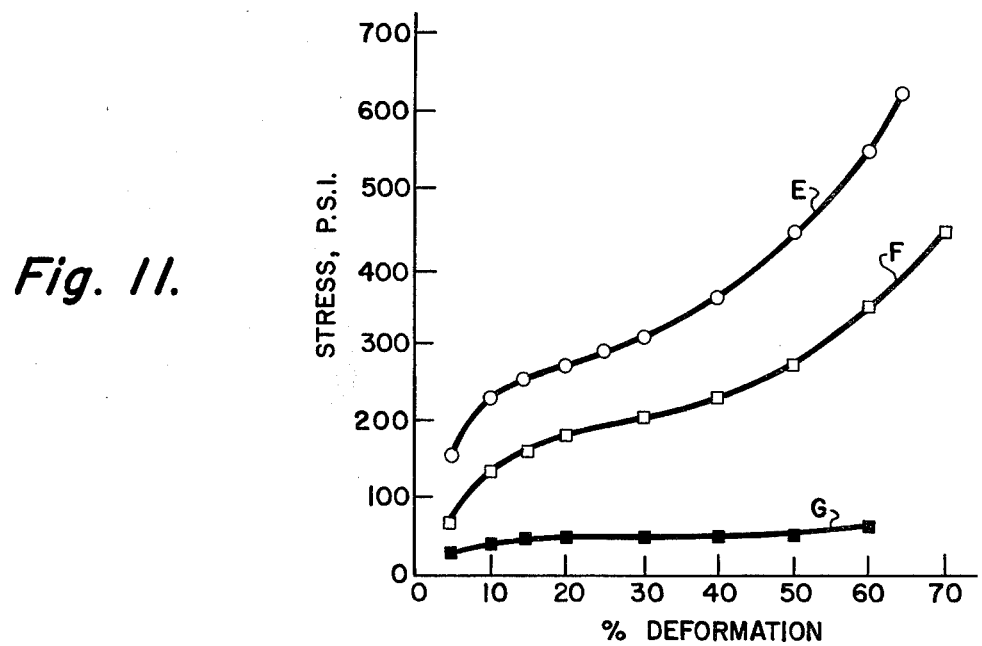
Figure 12:
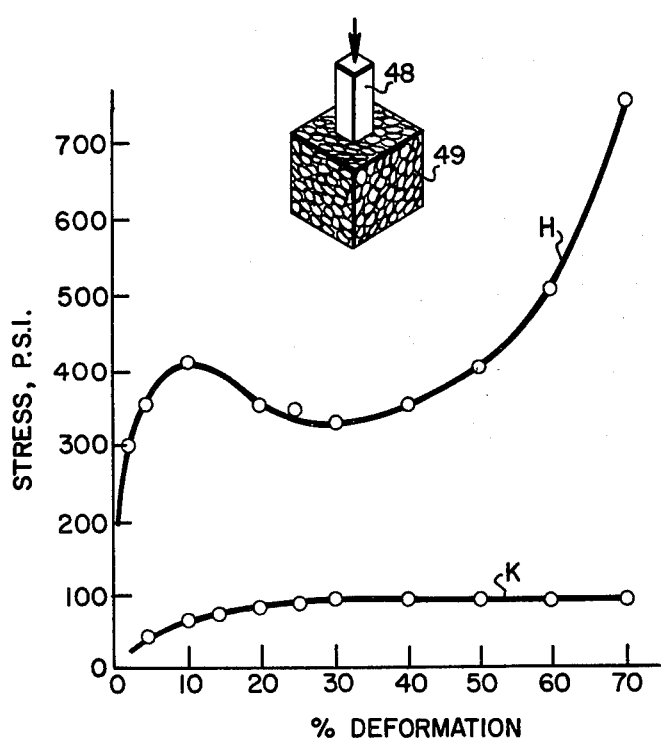

FIGS. 10, 11, and 12 are graphs.

DETAILED DESCRIPTION OF THE INVENTION

To place various aspects of this invention in their proper perspective, it is necessary to review briefly the procedure used to test and evaluate the energy absorption characteristics of some of its elements, particularly the determination of shock absorbence and some relevant data.

A 360# cylindrical weight was dropped 12′ onto a typical closed cell foamed aluminum alloy block ("AlMaG" 93% Al, 7% Mg) which had an average cell diameter of approximately ⅛″ and a density of 17½ lbs/ft³. The block was of excess dimension in all directions.

The impact caused an indentation of 28 in.³.

From this the total energy absorption per cubic foot can be calculated as follows:

$$\frac{\text{Indentation in test drop in foot}^3}{\text{Foot pounds in test drop}} = \frac{\text{Available metal foam volume}}{\text{Foot pounds it can absorb}}$$

$$\frac{0.016}{4320} = \frac{1}{X}$$

1 cubic foot of this foam (17.5 lbs/ft$^3$) absorbs 270,000 ft/lbs 1 lb of this foam absorbs 15,428 ft/lbs.

A typical vehicle weighing net 1200 lbs may carry 800 lbs additional of battery aggregates, 500 lbs in front and 300 lbs in the back. Assuming that 10% of this battery weight is foamed metal, such as the above, then the basic maximal impact absorbency is 50 lbs of foamed metal, which would absorb 771,428 ft/lbs of impact in front and 462,340 ft/lbs in the rear. These values are on the basis of a quantitative collapse of the entire mass for protection, which of course is an unlikely event. However, it seems reasonable to assume a 40% efficiency in the utilization, which would provide an actual impact protection of 308,571 ft/lbs in front and 185,136 ft/lbs in the rear. To this should be added the shock absorbing capacity of the normal electrogalvanic system and its enclosure, which might reach as much as 10% of the above. The vehicle speed, at which the battery aggregate will still absorb the total impact, is calculated as follows:

$$\text{Shock energy converted from poundals to foot/pounds} = \frac{1}{2} \frac{mv^2}{g} =$$

$$\frac{1}{2} \cdot \frac{\text{weight times velocity in ft/sec squared}}{32.2}$$

then, in our case for front end collision, assuming only 40% efficient utilization of the geometry presented by conditions usually short of a 90° straight head-on impact, and a vehicle weighing 2000 pounds, we would find $$308571 = \frac{2000 \text{ times } X^2}{32.2 \times 2}$$
$$X^2 = 9874.2720$$
$$X = 99.37 \text{ ft/sec}$$
or
67.75 mph Thus, at a speed of 67.75 mph the total impact energy of a stone wall front-end collision would be absorbed, and likewise on a rear end collision at 52.64 mph:

$$185,136 = \frac{2000 \times X^2}{64.4}$$
$$X = 77.20 \text{ ft/sec or}$$
52.64 mph However, human physiology does not permit too rapid a deceleration, even when the energy of the shock is completely neutralized. The experience of the Air Force indicates that an acceleration of 10 G should be the permissible limit. For the purposes of the general public, 7 G is a more realistic target. For the corresponding deceleration, a distance of about 2 feet is indicated. This is not necessary for the prevention of shock damage to automatically piloted vehicles carrying cargo, for example, in polar or desert region, or across oceans, but where humans are present a corresponding distribution of the shock absorbent envelopes should be observed in the battery aggregate, so that the resultant braking of speed is at least somewhat spaced over the width of the aggregate. This is easily accomplished by distributing the foamed metal energy absorbent members throughout the aggregates, with the heaviest distribution at the front part thereof, and generally effecting such staggering of the elements as to smooth the energy absorption curve throughout the path of deceleration.

A thermodynamic calculation indicates that the temperature increase incident to the energy absorption of the above example will be in the order of 80°–90° F.; thus well below the hazardous range.

Figure 1:
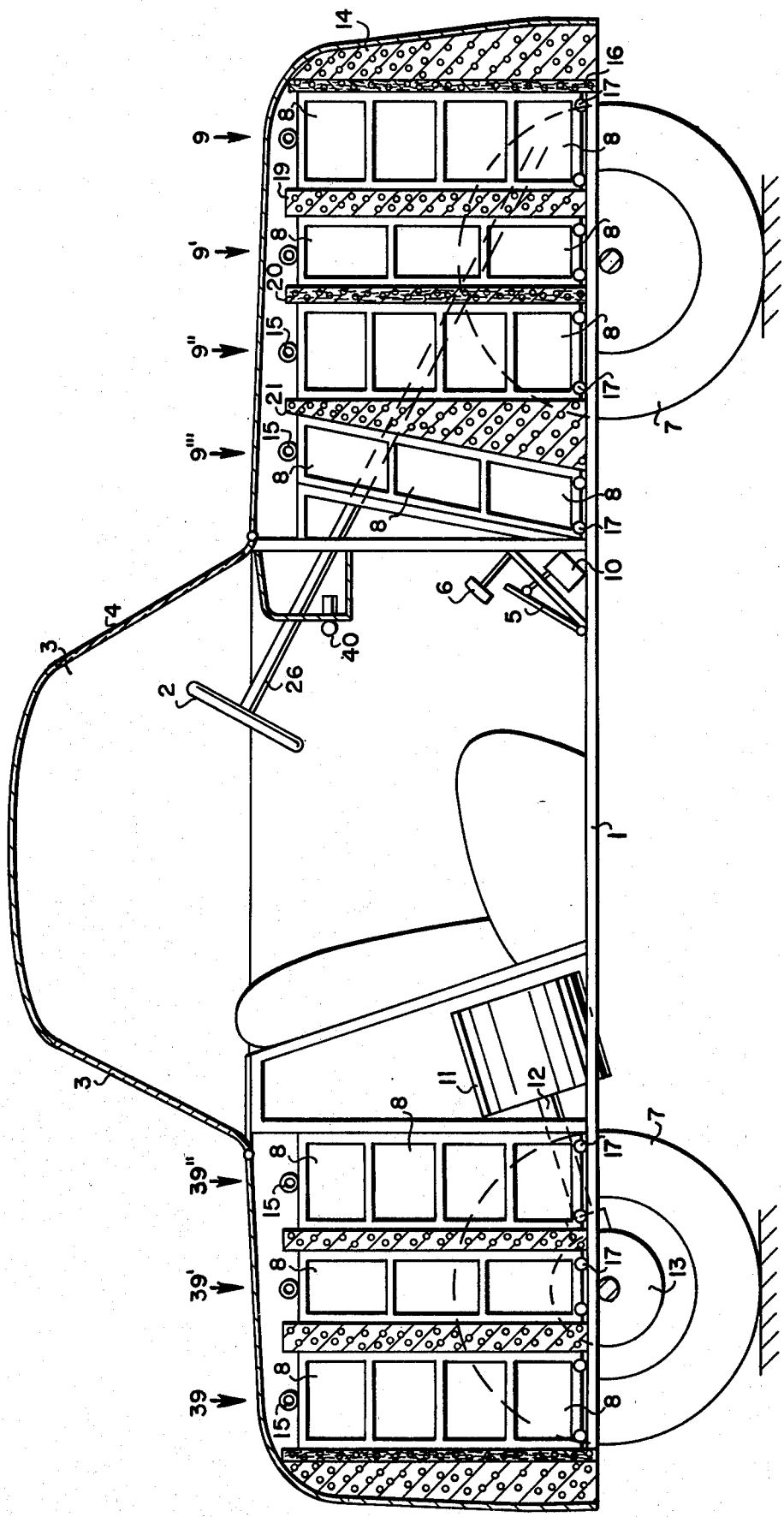
FIG. 1 is a longitudinal sectional view of an embodiment of the invention.

Referring now to the drawings, FIG. 1 shows the chassis 1 of an automobile, provided with the usual and conventional devices needed for an electrically powered automobile: a steering wheel 2, windows 3, windshield 4, accelerator 5, and brake pedals 6, wheels 7 and batteries 8, assembled in aggregates 9 of convenient size and weight and adapted to the geometries of the space into which they should fit.

The accelerator pedal 5 actuates contact controlling means 10 which may comprise, for example, a sliding contact or/and a crank iron (not shown) which, in turn, perform various switching functions, such as increasing or decreasing current and/or voltage, or alternatively, or additionally provide a chopping function to modulate the power supplied by delivering current intermittently. The steering may be power actuated or direct. As these cars are light, it will probably mostly be direct steering, acting directly and mechanically on the front wheels. In this particular embodiment the motor 11 drives the wheels by means of a shaft 12 and differential gear 13. It is possible to introduce a gearbox although this is normally not necessary with electric propulsion. It is also possible to provide a motor for each wheel, motors being coupled in series or in parallel, as convenience or the particular uses may dictate. An essential feature of this invention is that the batteries or battery aggregates are arranged in an order and disposition so as to absorb the shock of a collision and that the batteries and/or special organs designed as parts of the energy storage aggregate are designed to maximize the shock absorption by the use of plates of metallic zinc or other metal which has been foamed so as to form a highly shock-absorbent structure and/or by other special impact energy absorbing organs built into the energy storage system. I prefer to use a closed cell metal foam for this purpose because this has the maximal shock absorption.

Figure 2:
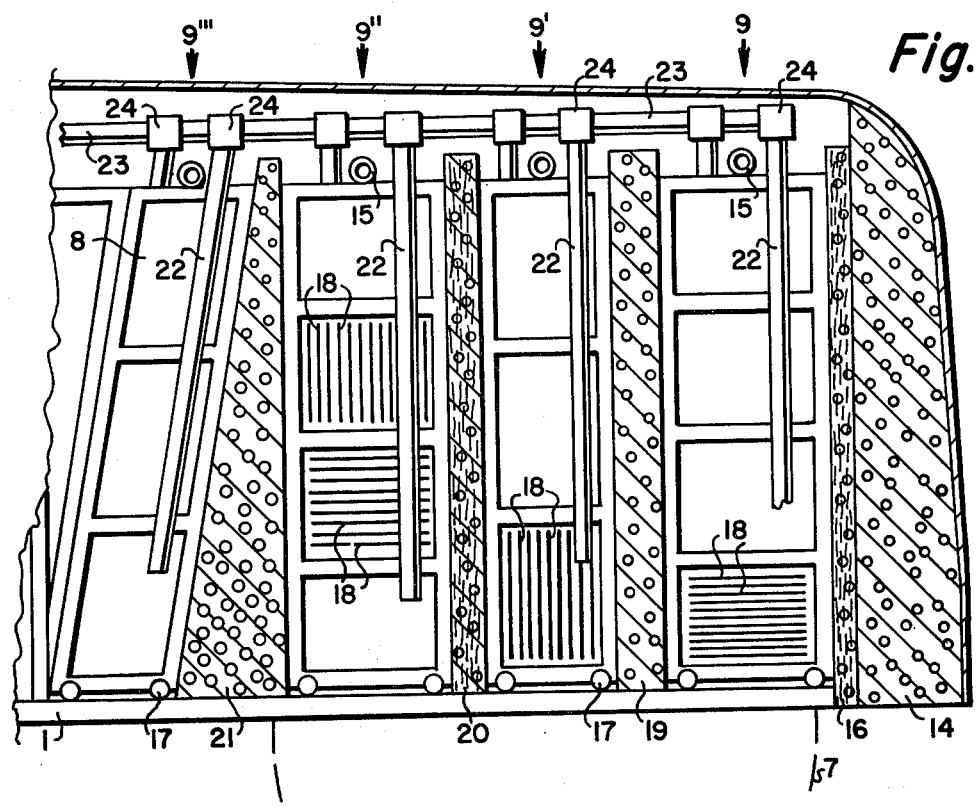
FIG. 2 is a detail sectional side view and FIG. 3 a top detail section, the embodiment of FIG. 1.
Figure 3:
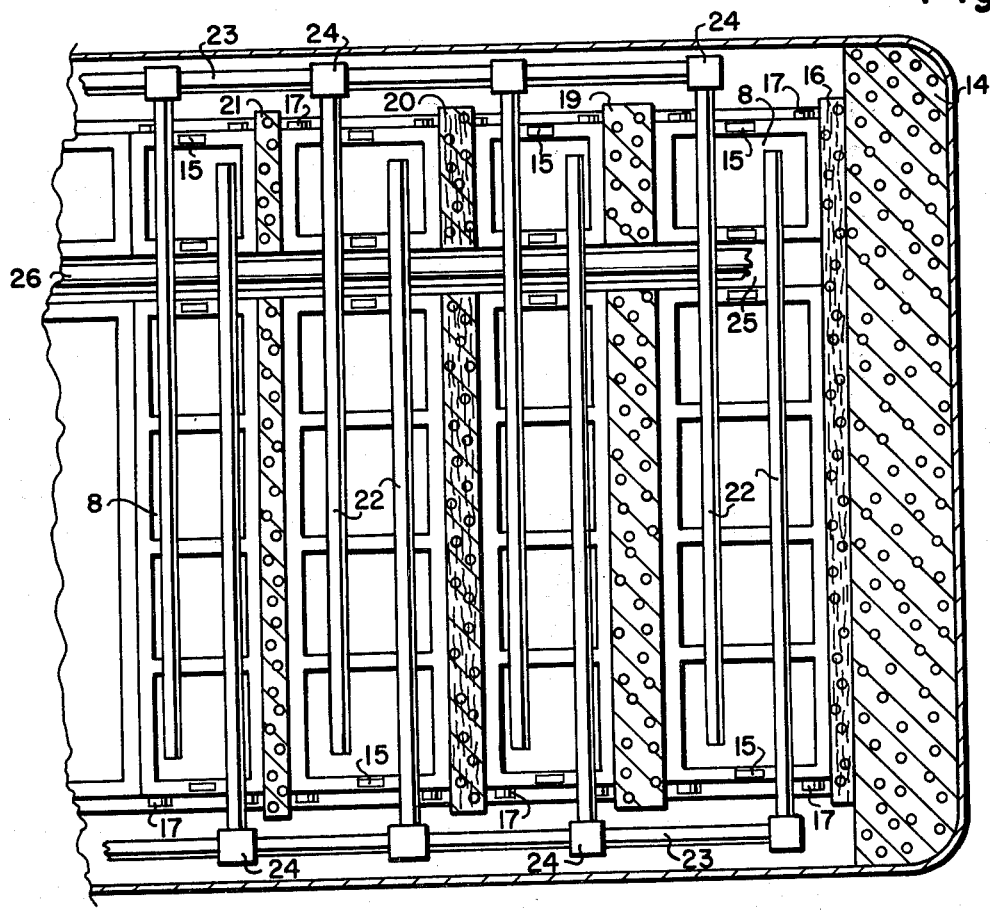

FIG. 1 further shows the disposition of batteries 8 within the battery aggregates 9, 9', 9'', 9'''. I prefer to have at least one metal foam shield attached to the front aggregate, in order to dampen the initial impact of a head-on collision. In FIGS. 1, 2, and 3, two frontal foam shields are utilized. The forwardmost shield 14 is a low density metal foam for the purpose of absorbing shock from low velocity collisions. Directly behind foam shield 14 is a high density fiber-reinforced metal foam designed to dampen the initial shock of high velocity head-on collision. The shields 14 and 16 may be separated from or may be attached to the frontal aggregate. The aggregates preferably weigh about 40–100 lbs for convenient handling, and have an eyelet 15 for easy handling by hoist. The aggregates, and the battery or cell units within them, are preferably arranged so as to avoid the continuation of any shear plane from one aggregate to the next. For example, the battery units in the front aggregate may be placed with the plates in the horizontal plane, followed by a plate of foam metal (optional) and by an aggregate having the battery units placed with the plates in a vertical plane. The innermost aggregate 9''' is preferably slanted to cause the impact propagation to direct the main thrust of material and of shock energy toward an area below the occupants of the vehicle, as is seen in FIGS. 1, 2, 6 and 9.

FIG. 2 shows additional detail of the placement and construction of the battery aggregates. The frontal aggregate 9 contains as a part thereof a high density impact breaking shield 16 of a foamed Almag alloy (93% Al, 7% mag) containing dispersed therein 27% by weight of copper coated ⅛" steel fibers of 1-5 mil diameter. This shield has a density of 71 lb/ft³. This foam has a deformation resistance in the range of 6000-24,000 lb for compression from 10% to 65%, as shown in FIG. 10, Curve A. The material for this shield may be made by the procedures described in U.S. Pat. Nos. 2,751,289; 2,983,597; 3,707,367; and 3,755,036.

The cells in the leading aggregate are oriented so that the plates 18 are in the horizontal plane, thus presenting a maximal number of edges to frontal impact.

The two middle aggregates 9' and 9" may have their plates in either the horizontal or the vertical plane, while the trailing aggregate 9'" is slanted, to deflect downward any shock impelled material or thrust. Friction reducing means such as wheels, rollers or freely rotatable balls 17 will facilitate the removal of the aggregates for re-charge or exchange.

19 is a frontal shield which may or may not be integrated with the frontal aggregate 9 and its shields 14 and 16. This is preferably also of high density foam. Fiber reinforcement of this shield is also advantageous, but not absolutely necessary.

The frontal aggregate with its shields is thus designed to absorb very strong impacts, but is too stiff to protect human occupants from the residual energies. To do this, the median aggregates, with their intermediate shields 19 and 20 of the density range preferably 10-35 ft/in³ are interposed. The wedge 21 serves to deflect the residual impact force from the human occupants by directing the force downward. To this end the wedge 21 has a graduated density, it is more compact in its upper portion so that the transmission of residual force from the impact will be deflected and the shock front brought to a downward orientation. For example, the wedge could be filled with granular foamed metal, densely tamped together in the upper portion of the wedge, but looser, and/or of lower density in the lower portion, or conversely dependent on the direction in which it is desired to deflect the impact wave in view of the design and requirements of the particular vehicle.

The innermost, trailing, battery aggregate, 9'" is preferably slanted for the reasons just outlined. 22, in FIGS. 2 and 3, is an electrical conductor, extending through or along the aggregates to carry the current from its batteries and cells, and 23 is a conductor leading the joined current to the motor 11 (FIG. 1) and such other current energized or regulating functions and devices as will be obvious to those skilled in the art. 24 are connectors for coupling the cells in series or in parallel. These are designed to permit ready service when necessary.

FIG. 2 a side sectional view and FIG. 3 a top section view, show the disposition of the individual batteries 8 and their connections to the conductor. FIG. 3 also shows the opening 25 which provides the passage needed for the steering column 26 between the aggregates, as shown in another dimension in FIG. 1.

In the cell shown in detail in FIG. 7, the anode 28 is of foamed zinc, thus contributing a substantial share of the overall shock absorption.

The cathode 27, in this case a porous grid made by compressing nickel powder at elevated temperature, contributes also in some degree to the energy absorption on collision impact.

The cathode carries a paste of nickel hydroperoxide. The reactions in this cell are:

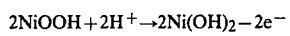

29 is the separator, in this case a multi perforated sheet of cellular polystyrene foam having a density of 5 lbs per square foot, or similar cellular material resistant to the electrochemical agents present in the cell. 30 are the conductors which collect and transport current from the plates.

FIG. 4 shows a battery system of high impact energy absorption. Within the case 31 is on the exposed leading side (as shown by the arrow) a cellular foamed metal reinforced with copper coated steel fiber of 1 mil diameter and ⅛" length. This fiber reinforced shield is about ⅝" thick. It is preferably made of cellular aluminum—7% magnesium (Almag) alloy having dispersed therein 27% of its weight of the steel fibers. The density of the shield is 71 lbs/cu.ft. Its energy-compression resistance curve A is shown in FIG. 10. The shield 16 has impact energy absorption in excess of 30,000 foot pounds. This shield is very resistant to shear and puncture and will distribute shock energy evenly on the following organs of the battery unit.

The cells may be constructed as shown in FIG. 7, normally using an alkaline electrolyte, or they may be more conventional lead - lead peroxide type cells in which the supporting grids are made of foamed lead with closed substantially spherical gas inclusions, and an acid electrolyte. In one embodiment of the invention I may use within each case alkaline- and acid electrolyte cells in such proportion that in a collision situation the released electrolytes will be present in stoichiometric proportions, thus neutralizing each other so that no caustic liquid will be splashed around further aggravating the accident. In FIGS. 4 and 5, cell 32 is a lead-acid cell with foamed grids, cell 33 a zinc-nickel hydroperoxide cell, and 34 either of these or perhaps a third type of cell which fits into the particular design. In FIG. 4, 35 is a relatively soft foam, having a compression curve like FIG. 10, C, or FIG. 11, E, and is thus designed to convert shock energies of lower intensity into thermal energy, thus moderating the deceleration. When the cells are ruptured, the mixed electrolytes will be forced by deceleration toward the shield 35 in FIG. 4 or 21 in FIG. 6, so that the shock on the shield will be absorbed smoothly according to the whole surface curve, FIG. 11, Curve E, and not according to FIG. 12, Curve H. This latter penetration curve would result in undesirable localized peak loads and even in critical penetration of localized forces. 36 is a conductor connecting the opposite poles of a cell to effect a series coupling.

FIG. 5 shows a 3 cell battery in which the common envelope 41 of the cells, 32, 33 and 34, is made of a highly shock absorbent metal foam. The top of the envelope is made of a rubberlike elastomer 37 so as to better contain the electrolyte 44 in the cells in the event of a collision of moderate force.

Referring to FIG. 8, the chopper device 42 allows the batteries 8 to be connected in series, parallel configuration to provide optimum discharge rates consistent with energy conservation and usage. The motor 11 is selected for full load operation on the basis of the current and voltage supplied by the batteries. This constant amperage and voltage is delivered to the motor 11 via the chopper device 42 and key switch 40.

The chopper device 42 provides an on-off switching action of the current on a percentage time basis. Contacts 47 on the device provide a different percentage of off and on time.

43 is a contactor operated by the accelerator pedal 5 (FIG. 1) such that progressive contacts provide longer periods of "on" time and shorter periods of "off" time. Depressing the accelerator 5 fully selects the contact that provides 100% of the current for 100% of the time to provide acceleration. When the desired speed is attained, the pedal 5 is partially released thereby allowing the contactor 43 to make connection with the appropriate contact to provide a different proportionality factor such as 50% on and 50% off for cruise at a constant speed.

The chopper device therefore allows optimum motor and battery performance by matching a time factor to road conditions and car performance.

Figure 9:
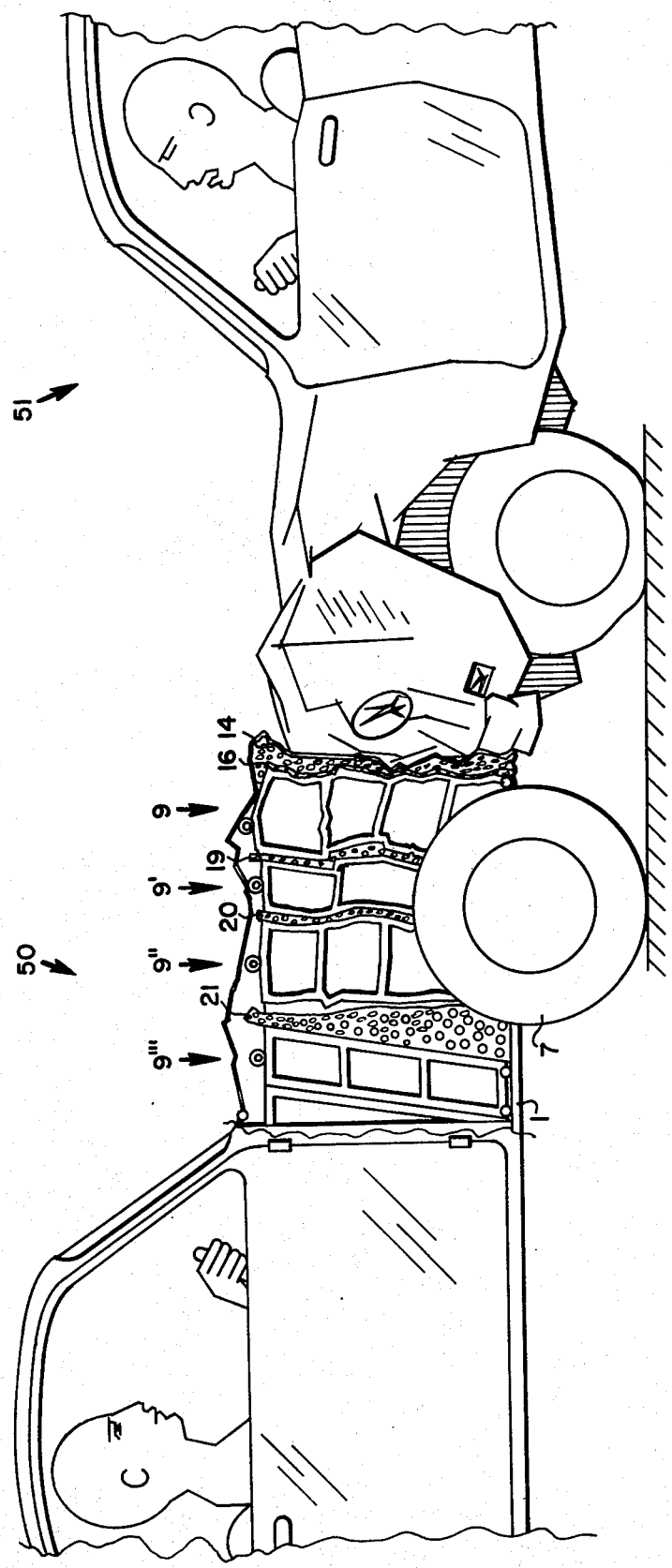
FIG. 9 is a side view partially in section, illustrating the function of the invention.

To properly utilize the energy absorption properties of the cellular foamed metals, a consideration of their energy absorptive properties in relation to compression seems essential. Reference in this regard is made to FIGS. 9, 10 and 11. FIG. 10 shows the pressure versus % compression Instron curves of:

A. Foamed aluminum reinforced with steel fibers;
B. Foamed zinc; and
C. Foamed aluminum-Magnesium alloy of lower density.

Since the energy absorption is proportional to the areas under the curves, it is strikingly apparent that the fiber reinforced foam has total energy absorption of an altogether different order of magnitude than the others, even if we compensate for the higher density.

The steel fibers used for reinforcement in A were copper plated steel, ⅛" length, 1 mil diameter, 27% by weight. The overall density of the sample was 71 lbs/ft$^3$.

Sample B was zinc, foamed as in Example 2, density 61 lbs/ft$^3$; Sample C foamed aluminum—7% Magnesium (Almag), density 12.8 lbs/ft$^3$; Sample D was rigid polystyrene foam, 2.4 lbs/ft$^3$.

Curve A could not be run beyond 65% compression because it ran off the scale of the large Instron Tester at 24,000 psi.

While thus the reinforcement with steel fiber adds another dimension to energy absorption in violent shock situations, the foam thus reinforced in the range 3½–30% steel fiber is generally not sufficiently soft and resilient to alone give the necessary protection to life. For example, the human skull is damaged at pressures lower than the 6000 psi pressure where energy absorption of the reinforced foam begins. For this reason I prefer to use the steel fiber reinforced foam in front shields, inserted so as to meet the full violence of the initial impact, and to use softer foams at the central or trailing aggregates.

FIG. 11 shows the compressibility of these on a much lower pressure scale. In FIG. 11, Curve E shows the pressure versus compression curve of foamed aluminum—7% magnesium of density 17 lbs/ft$^3$, Curve F of foamed pure aluminum, 14 lb/ft$^3$, and Curve G rigid polystyrene foam, density 2 lbs/ft$^3$.

In the above curves, pressure was applied evenly over the surface of the sample.

It was surprising to me that the superiority in total energy absorption of the fiber reinforced foam (Curve A) was as marked as it was found to be, since fiber reinforcement in the better explored plastic foams generally does not result in greatly improved compressive strength. The explanation may be that the metal foams have little inherent stretchability, but rupture sharply at points of stress differentials, whereby concentrated stresses appear in narrow areas or streaks, which may channel and cause ruptures elsewhere. This is better countered by the judicious use of fiber reinforcement to increase the tensile and flexural strengths, thereby preventing or greatly retarding any breakage, cracking or piercing during the compression.

FIG. 12 shows the compression versus deformation curve for the same foamed aluminum—7% magnesium foam as in FIG. 11, Curve E, and the same polystyrene foam as in FIG. 11, Curve G.

While the polystyrene Curve K, FIG. 12, retains essentially the same form in a penetration test as shown in the insert on FIG. 12, where a sharp cornered square tool 48 pierces through the test block 49, the foamed metal Curve H shows sharp jumps and a pronounced S-curve, which further explains why the metal foam is so very responsive to the pressure distributing and resistance equalizing effect of the fiber inclusions.

In FIGS. 1, 2 and 3, a shield 14 is shown in front of the fiber reinforced maximum energy absorption shield 16. This space could be used to further increase the thickness of the fiber reinforced shield 16. However, the impact absorption is already sufficient to protect the car under any foreseeable contingency, and therefore it is preferred to avoid additional and unnecessary weight by filling the front space with a low density metal foam, useful in absorbing minor shocks and thus preserving the high impact shield 16 in an undented perfect condition. However, for exceptional protection such as may be needed for heavy trucks, locomotives or cable cars, I may use the total front thickness available for the fiber reinforced metal foam plate 16.

The following example will illustrate the function of an embodiment of my invention in mitigating the effects of a head-on collision between automobiles.

EXAMPLE 1

In FIG. 9, an electrically powered automobile 50 embodying the present invention is colliding with a conventional vehicle 51 at 40 miles per hour. At the speed indicated, more than half of the impact has been absorbed by the first battery aggregate 9 and its frontal shields 14 and 16. The two middle aggregates 9' and 9" have been considerably deformed and dislocated, though some of their cells still remain operable. The boundary between these middle aggregates is only moderately bent, and does not appear to have been pierced, so that the impact force beyond this point has been applied along a substantially even front, and thus absorbed by a whole surface compression, as shown in FIG. 11, Curve E. When the shock waves are thus absorbed by a whole surface compression, evenly, there will be no dangerous energy thrusts, such as those able to pass through irregularly pierced or torn barriers illustrated by FIG. 12, Curve H. The trailing aggregate 9''' has not been damaged, and the distance of deceleration has been sufficient to ensure that the occupants of the car have not been hurt.

This yielding and gradual, yet substantially complete, shock absorption by the battery aggregates of the electric car has also extended considerable protection to the meeting car, which would otherwise have sustained still greater damage.

FIG. 6 shows a detail view of the upper portion of the trailing edge of the middle aggregate 9'', and the forward edge of the trailing aggregate 9'''.

In the particular instant shown in FIG. 6, lasting possibly a millisecond, the electrolyte liquid 44 from the crushed cells has been forced by deceleration against the wedge plate 21, but has not yet been expelled. Although this liquid may quickly penetrate and relieve pressure, it will, during this critical instant, serve as a barrier equalizing pressure on the wedge shaped shield 21 thus avoiding piercing or tearing. The full energy absorption of the wedge 21 is thus utilized.

Preferably, the wedge 21 will be more yielding in its lower part, and will thus help deflect the thrust toward the bottom of the vehicle and away from its occupants, fully utilizing its capacity for energy absorption.

Shock absorbent foamed anode plates or grids of either zinc or lead may be made by the methods shown in the following examples:

EXAMPLE 2

To prepare the zinc anode plate, I add to molten zinc ¼% titanium hydride, and mix it intimately using a silicon carbide stirrer in a cast iron pot, at a temperature just above the melting point of zinc (420° C.). Subsequently, I either raise the temperature to the decomposition temperature of the particular foamant employed, for titanium hydride at 700° C., or apply a partial vacuum, in either case the titanium hydride will decompose rapidly so that the metal will foam. It can then be case or spread to form the plates, the amount of foaming being governed by the amount of titanium hydride present and the temperature.

EXAMPLE 3

60 Grams powdered zirconium hydride was ground into 60 Grams of the eutectic alloy of magnesium and zinc having a melting point of 341° C. This composition containing the ground and wetted zirconium hydride was allowed to cool and solidfy. 5 grams of the above alloy, finely ground, was then mixed into 50 grams molten zinc at a temperature of 650° C. The added powder dispersed instantly with a minimum of agitation in the zinc. There was a violent evolution of hydrogen gas with production of a molten foamed zinc, which was rapidly poured onto a graphite lubricated steel plate, where it solidified to a foamed sheet approximately 1 cm thick. The solidification was rapid, so that a solid sheet of foamed zinc resulted. For continuous mass production I prefer to use the procedure of U.S. Pat. No. 3,773,098 or 3,782,919.

In addition to the battery systems discussed above, I may also employ other types of batteries employing zinc electrodes such as zinc-silver peroxide element (alkaline), zinc-copper element (acid electrolyte), or I may use an electrochemically conventional lead oxide-acid electrolyte battery, in which the lead has been foamed, analogously with the zinc, or lithium-iron sulfide batteries.

The procedure for making and fabricating the foamed metal is not critical for the present application. All metal alloys ever tried could be foamed by the above methods or obvious variants thereof when their melting points were below about 1000° F. Above this temperature difficulties arise, which, however, could be resolved even for steels and nickel, assuming continuous process and sophisticated temperature controls.

Other methods for making cellular foams may also be employed, such as casting the metal with glass spheres, or with coal bubbles or with salts containing firmly held water of crystallization which then is released in the melt. However, the methods mentioned in the examples and patents cited will give the foams of highest energy absorption in relation to their weight.

Very sharp deceleration rates are permissible in vehicles governed remotely or automatically in the absence of human pilots or passengers. However, the deceleration rate for humans is limited to about 7 earth gravities. Practically, this means that the deceleration should take place over a distance of about 18'', and that the energy absorption should be maximal at the leading edge, and decrease toward the trailing edge in a substantially logarithmic regression. Accordingly, the battery aggregates should preferably by designed to distribute the principal zones of energy absorption at the leading side, with progressively easing absorption as the remaining kinetic energy of the vehicle progressively is reduced, as is apparent from the design and the disposition of the energy absorbent metal foam plates or components shown in FIGS. 1, 2, 3, and 9.

The design and disposition of the unit cells also contribute to the overall effect. For example, to effect a maximal energy absorption on initial impact, I may place the cells so that the initial shock will strike the edges of the battery grids and plates. The separators in these cells even though microporous, may be made from a stiff, resistant resin matrix, such as an epoxy or polyether resin of high flexural modulus and breaking strength.

In the second row of cells counting in the direction of the impact, or the second line aggregates 9' and 9'', design should tend more to secure a continuously yielding high energy absorbent design, adverse to sudden breaks, and in the last cell rows, design stress may be placed on providing a substantially continuous barrier transversal to the shock direction, tending to prevent any narrow shock zones from penetrating in depth.

While reference has been made to the use of various foamed metals as energy absorbents, it is understood that other energy absorption systems might be employed in the battery aggregates. The principal inventive concept is thus to utilize, by special design and material selection, the weight and mass of the battery aggregates for greatly increasing the collision safety of electrically propelled vehicles, so that fuel can be saved by minimizing total weight without sacrificing safety.

While reference has been made particularly to the high energy absorption achieved by the use of closed cell foamed metals, preferably with spherical gas cells, an appreciable contribution to the energy absorption by the battery aggregates is attainable by their construction, and by the material choice and treatment of their component members, including shields and enclosures, but also in a lesser yet not wholly insignificant degree such secondary components as separating members and ribs in electrodes and casings.

Further, the energy absorption balance is affected by the orientation and disposition of the various members within the electrogalvanic cells, and their orientation and disposition of these cells within the aggregates. Thus, an orientation of the metal plates in the galvanic cells causing these to meet a collision wave with their edges is generally conducive to the maximal energy absorption. Where ample energy absorption is provided by nonelectroactive foamed metal inserts or end plates, it may be preferred to maintain a different orientation of the individual battery cells within the common envelope, so as to avoid a complete polarization of the anti-impact action. For this purpose I may, for example, orient the cells on the front side of the electric storage battery aggregate so that the plates 18 will receive the impact of a frontal collision on their edge, but to have the cells in center and rear of the battery aggregates oriented in a transversal, or even random orientation with reference to the vehicle's own direction of motion. (FIG. 2).

The invention may be applied to various electrochemical systems, including the conventional lead battery, in which either the anode plate or the cathode plate or both may use a grid of foamed lead; but my preference is to employ a zinc-nickel hydroperoxide cell, in which the zinc anode in in particular could be foamed. However, even without this modification, the zinc-nickel hydroperoxide cell is very attractive because of its high power per unit of weight which gives it a 2:1 advantage over the lead batteries in the power to weight ratio.

The zinc-nickel hydroperoxide battery has been recharged 100–200 times, against 300 times for the average lead battery. However, the task of increasing this does not appear insuperable, and the advantages in power and weight would appear to warrant its use for electric propulsion even at the present development stage.

Other battery systems which might be used are the well known nickel-iron and nickel-cadmium batteries, and in the luxury class perhaps the zinc-silver peroxide batteries.

The nature of the gas enclosure in the impact absorbing foamed metal plates is secondary. Generally, for reasons of convenience I have used hydrogen release agents such as those mentioned in Examples 1 and 2 for forming the Foam cells. However, hydrogen may in time diffuse out from the cells, so that they ultimately become filled with nitrogen.

Also, I may use alternate foaming agents, in particular with metals or alloys melting above 1000° F., such as bisulfites, releasing $SO_2$, or carbon in conjunction with an oxide, releasing CO, or even evaporate a metal of low boiling point such as zinc, in which case the resultant cells might contain a vacuum at ordinary temperatures.

Generally, I envisage electric storage battery aggregates characterized by impact energy absorption exceeding 50,000 and preferably 100,000 ft/lbs as the said aggregate is compacted and compressed by the collision impact of a dead stop, such as running into a stone wall, or a head-on collision with a similar vehicle coming with the same speed from the opposite direction. To control the deceleration rate, the storage aggregates should preferably be designed so that the compressible distance of the aggregate shall be at least 10" and preferably 18 to 24". By the "compressible distance," I mean the difference between the leading (front) side of the aggregate and its trailing (back) side normally, and the same distance after completed compression by maximal expectable impact.

Further, the impact absorbing members should preferably be disposed so that their highest concentration within the electric storage aggregate will be in the space nearest to its lading edge, so as to absorb a major part of the initial shock, with a logarithmically decreasing concentration of the shock absorption so as to achieve a smooth deceleration. The shock absorption attainable in this manner should suffice to prevent damage to persons of a collision at the normal operating speed of an electrical rechargeable vehicle designed for city use, or about 30 MPH, and even to provide a substantial margin of safety beyond this speed.

When granular foamed metal is used for the purposes indicated above, I prefer to employ granules having a diameter or cross section in the range $\frac{1}{2}$ mm to 100 mm. The granules are particularly useful where it is anticipated that the electrolyte of the cells will be released by the force of any major collision, and it is desired that they be able to penetrate the partitions fast either to provide a hydrostatically equalized pressure effect for achieving a smooth energy absorption curve (FIG. 10) or to facilitate the mutual neutralization of the electrolytes from acid- and from alkali-cells within the same aggregate.

While I prefer to use foamed metal as the principal energy absorbent as giving so far the best results by a wide margin, I could also use in part other high absorbence systems such as folded steel plate which absorb shock energy by deformation, or high density plastic foams and the like.

In utilizing foamed metal inserts or shields for the purposes of this invention, I prefer to have as high bubble density as achievable without disrupting or changing the essentially spherical form of most of the bubbles. The size of the bubbles may be from a diameter of 1 micron to 1 centimeter and all the foamed metal contained in a battery aggregate may represent between 1% and 80% of its volume.

While the preceding discussion and examples have stated certain specific data and dimensions, the invention may be varied within considerable limits dependent on the details of each application.

When reference is made to "cellular" foamed metals, I generally have a preference for spherical, closed gas bubbles in a metal matrix, but when practical conditions dictate, may tolerate some deviations from this ideal state such as interconnected cells and some distortion in the gas bubbles.

In the reinforced metal foam shields, the reinforcing fibers may be composed of any material bonding to the particular foamed or cellular metals used, including ceramic, graphite or metal fibers on "whiskers", the former preferably metal coated for maximum adhesion. The steel fibers preferably used for reinforcing foamed aluminum alloys may be copper plated for maximal adhesion. They generally will have an average length between 0.01" and 2", preferably 0.05" to 1"; and a thickness of generally 0.0001" to 0.05", the range of 0.0005" to 0.003" being preferred. Generally the quantity used of these fibers should be not less than $3\frac{1}{2}$% on the total weight, and preferably about 10%–30%.

The closed spherical gas bubbles within the metal matrix will generally have an average diameter of 1 micron 1 cm and preferably between 10 microns and 3 millimeters.

The permissible deceleration rate on dead stop from any speed of travel will be governed by the tolerance of the most sensitive component present. Where humans are present, this should be limited so that the deceleration never exceeds 10 G and preferably not 7 G on deceleration from 30 mph to 0, and preferably not even on deceleration from 60 miles per hour to 0, when the vehicle strikes an immovable object.

Referring to "common enclosure" I understand with this expression not only sheets, film, boxes or other material enclosing or forming the outer skin of aggregates 9 singly or severally, but also the large enclosures encompassing all of the power storage associated shielding as shown in FIG. 1 under the front hood or encompassed by the enclosure in the rear of the vehicle.

Having thus disclosed my invention, I claim:

1. A wheeled land vehicle which is powered and driven by electricity comprising:
   a passenger compartment,
   a plurality of storage batteries,
   a plurality of said storage batteries located between said passenger compartment and the front of said vehicle, and
   a further plurality of said storage batteries located between said passenger compartment and the rear of said vehicle,
   characterized by bodies of foam, said bodies of foam being disposed between at least some of said batteries,
   at least some of said bodies of foam being disposed in spaced apart relationship longitudinally of said vehicle,
   at least one battery disposed between each of said longitudinally spaced apart bodies,
   each of said bodies extending transversely with respect to said vehicle.

* * * * *